United States Patent

Nerini et al.

[11] Patent Number: 5,888,581
[45] Date of Patent: Mar. 30, 1999

[54] EMULSIONS BASED ON ACRYLIC POLYMERS

[75] Inventors: Ivan Fuso Nerini; Massimo Cesana, both of Milan; Daniele Becchi, Novellara, all of Italy

[73] Assignee: Elf Atochem Italia S.r.l., Italy

[21] Appl. No.: 939,908

[22] Filed: Sep. 29, 1997

Related U.S. Application Data

[63] Continuation of Ser. No. 623,704, Mar. 29, 1996, abandoned.

[30] Foreign Application Priority Data

Mar. 31, 1995 [IT] Italy ............................. MI95A0644

[51] Int. Cl.$^6$ ....................................................... B05D 3/02
[52] U.S. Cl. .............................. 427/64; 427/73; 427/154; 427/226; 427/379
[58] Field of Search ................................ 427/64, 73, 154, 427/155, 226, 379; 65/60.3

[56] References Cited

U.S. PATENT DOCUMENTS

| | | | |
|---|---|---|---|
| 3,753,759 | 8/1973 | Bouchard et al. | 252/301.3 |
| 3,821,009 | 6/1974 | Lerner et al. | 117/33.5 CM |
| 4,122,213 | 10/1978 | Ito et al. | 427/64 |
| 4,123,563 | 10/1978 | Mitobe et al. | 427/68 |
| 4,139,657 | 2/1979 | Watanabe | 427/68 |
| 4,217,015 | 8/1980 | Matsumoto et al. | 316/30 |
| 4,284,662 | 8/1981 | Matsuzaki et al. | 427/68 |
| 4,327,123 | 4/1982 | Levine et al. | 427/64 |
| 4,339,475 | 7/1982 | Hinosugi et al. | 427/64 |
| 4,350,514 | 9/1982 | Akiyama et al. | 65/36 |
| 4,954,366 | 9/1990 | Pezzulo et al. | 427/68 |
| 4,990,366 | 2/1991 | Pezzulo et al. | 427/68 |
| 5,039,551 | 8/1991 | Fujita | 427/64 |
| 5,145,511 | 9/1992 | Patel et al. | 65/42 |
| 5,208,065 | 5/1993 | Osaka et al. | 427/64 |
| 5,344,353 | 9/1994 | Jang et al. | 445/45 |
| 5,731,378 | 3/1998 | Nerini et al. | 524/559 |

FOREIGN PATENT DOCUMENTS

| | | |
|---|---|---|
| 467 357 A1 | 7/1991 | European Pat. Off. |
| A-53-003053 | 1/1978 | Japan. |
| A-60-071670 | 8/1985 | Japan. |
| 2 015 819 A | 9/1979 | United Kingdom. |

*Primary Examiner*—Erma Cameron
*Attorney, Agent, or Firm*—Bell, Boyd & Lloyd

[57] ABSTRACT

This invention relates to aqueous emulsions based on acrylic polymers and their use for preparing films to be used in processes of preparation of cathode ray tubes, having filming temperature between about 20° and 40° C. which after drying produce films which, submitted to heating in nitrogen atmosphere, have a weight loss, for films having a thickness of 1–2 mm, and for the following cycle of heating:

11° C./minute from 25° to 375° C.,
5° C./minute from 375° to 440° C.,
isotherm at 440° C. for 45 minutes,
respectively of:
  from 25° to 245° C. lower than 15% by weight
  from 245° to 375° C. from 30 to 70% by weight
  from 375° to 440° C. of 97–99% by weight
  after the isotherm at 440° C. the remaining residue is lower than about 0.3% by weight, the curve gradient in the on set point ranging from 0.03 to 0.08 mg/°K., and at 360° C. from 0.12 to 0.30 mg/°K.; the on set temperature being at most of 300° C.

8 Claims, No Drawings

EMULSIONS BASED ON ACRYLIC POLYMERS

This is a continuation application Ser. No. 08/623,704, filed on Mar. 29, 1996, now abandoned.

FIELD OF THE INVENTION

The present invention relates to emulsions based on acrylic polymers. In particular the emulsions of the invention are suitable for preparing metallized luminescent screens for cathode ray tubes.

More specifically the invention relates to the use of special emulsions based on acrylic polymers as single layer which can be volatilized by depolymerization without combustion with slight organic residue concurrently with the panel sealing to the CRT funnel (cathode ray tube).

BACKGROUND OF THE INVENTION

Filming methods utilizing solvent-based filming lakes are known, which, when deposited on a humid phosphor layer, produce a thin and continuous film on which a metal layer condenses by sputtering.

Such processes produce handmade articles having good characteristics, however they have the drawback of requiring the employment of solvent which must be subsequently evaporated and recovered to avoid environmental pollutions. The production plants need therefore units for the solvent recovery.

For this reason films deriving from drying of aqueous emulsions have been studied since long.

On the panel carrying the screen, the aqauecus emulsion deposits, which is dried by heating.

The purpose of this polymeric film is to remove the irregular surface of the phosphor particles forming the screen, and to provide a very uniform sublayer on which the sputtered metal then deposits in order to form a surface like a mirror to reflect the screen light.

Thanks to this polymeric film the metal does not penetrate into the screen below even though the phosphor particles can jut outside the film.

The screen then undergoes a treatment at high temperature from 400°–450° C. (the so called baked-out) to remove the polymeric film. The gaseous products of the polymeric film decomposition come out of the holes of the metal layer.

A drawback of this process consists in that the carbon residues deriving from the film decomposition lead to an insufficient gloss of the screen.

These processes require therefore an additional process of slow prebaking to completely remove all the organic materials.

Processes wherein sufficient amounts of air are used during baking to volatilize the acrylic polymer, are also known. See for instance U.S. Pat. Nos. 4,217,015 and 4,350,514.

This needs process changes for introducing air, leading to more expensive and complex processes.

Aqueous emulsions based on acrylic polymers capable of forming films for preparing cathode tubes are described in U.S. Pat. No. 5,145,511. It is a process for manufacturing cathode tubes with only one step of film removal deriving from the emulsion simultaneously with the sealing of the cathode tube panel.

To this purpose it must be noticed that any filming acrylic emulsion cannot be employed in the process of the patent indicated from an industrial point of view. In fact tests carried out by the Applicant (see the examples hereafter) have shown that the emulsions based on acrylic esters utilized in said patent do not succeed in meeting industrial requirements, i.e., in useful times, compared with conventional processes. The necessary times for having the film decomposition are high. As a matter of fact said tests have shown that the decomposition of said acrylic polymers leaves also considerable organic residues, from about 0.5–2% by weight which are detrimental for the screens gloss.

DESCRIPTION OF THE INVENTION

The Applicant has unexpectedly found that it is possible to overcome the drawbacks of the processes of the prior art both in terms of film decomposition times and in terms of image gloss, utilizing a particular aqueous emulsion based on acrylic polymers which allows to carry out a film containing phosphors which has the following combination of properties:

- the film can be volatilized simultaneously during the sealing of the panel to the CRT funnel;
- the film volatilizes by depolymerization without leaving organic residues in any case lower than 0.3% by weight;
- the film is volatilized in absence of oxygen allowing to remove the additional equipments for the introduction of air rich in oxygen;
- the film decomposes at a temperature lower than the melting temperature of the "frit", meaning by "frit" the complex composition formed by the emulsion, phosphors and other components necessary for depositing the material layer which has to be activated in the cathode tube;
- the film decomposes at a rate such as to hinder the formation of bubbles which would cause the separation of the aliminium film (the so called blistering phenomenon);
- the absence of organic residue or amounts lower than 0.3%, preferably lower than 0.05%, more preferbly lower than 0.01% by weight, produces a considerable improvement of the luminescent layer gloss with consequent higher yields in the image definition of the cathode tube.

Object of the present invention is an aqueous emulsion based on acrylic polymers and having filming temperatures between 20° and 40° C. which after drying produce films which, submitted to heating in nitrogen atmosphere, have a loss weight, for films having a thickness of 1–2 mm, and for the following heating cycle:

11° C./minute from 25° to 375° C.,
5° C./minute from 375° to 440° C.,
isotherm at 440° C. for 45 minutes, respectively of:
from 25° to 245° C. lower than 15% by weight
from 245° to 375° C. from 30 to 70% by weight
from 375° to 440° C. of 97–99% by weight
after the isotherm at 440° C. the remaining residue is lower than about 0.3% by weight, the curve gradient in the on set point ranging from 0.03 to 0.08 mg/°K., and at 360° C. from 0.12 to 0.30 mg/°K.; the on set temperature being at most of 300° C., preferably between 220° and about 285° C.

Preferably the weight loss in the stretch from 25° to 245° C. is lower than 5% by weight, from 245° to 375° C. the weight loss is of 40–60% by weight, from 375° to 440° C.

is 98–99% by weight, after the isotherm at 440° C. it is lower than 0.05%, more preferably lower than 0.01% by weight.

The preferred curve gradient in the on set point is comprised between 0.06 and 0.08 mg/°K.; at 360° C. is of 0.15 to 0.25 mg/°K.

Aqueous emulsions based on acrylic polymers meeting the above indicated criteria, during the forming process of the cathode ray tube preferably have the following composition:

A) butylmethacrylate from 40–75 parts by weight
B) methylmethacrylate from 15–50 parts by weight
C) methacrylic acid from 0.5–5 parts by weight
D) ethylacrylate from 4–15 parts by weight.

The A, B, C and D percentages are intended as starting comonomers utilized in the process for preparing the emulsion.

These are the preferred monomers.

Preferably the polymers of the emulsion of the present invention are uncured and uncurable in the conditions of the emulsion preparation and in the thermal treatment indicated below simulating the CRT preparation process.

As component A) instead of butylmethacrylate, lauroyl-, decyl-, undecyl-, ethyl-, propyl-, ethylhexylmethacrylate, etc., can for instance be used.

As component C) instead of methacrylic acid, other polymerizable carboxylic acids, such as acrylic acid, itaconic acid, etc. can be used. Instead of D) methylacrylate can be used considering the relative molecular weight and the different filming temperature of the polymers containing this comonomer.

The addition of the component D) has the purpose of adjusting the decomposition rate at the desired degree without moreover limiting the zipping phenomena which are a consequence of monomers A) and B).

The ratio between the component A) and B) must be such as to give a minimum filming temperature between about 20° and 40° C.

The aqueous emulsion object of the patent preferably gives linear uncured and uncurable polymers during the thermal cycle, as defined below, to which the film is subjected during the application leading to the CRT formation, wherefore also under this point of view no carbon residues are produced.

The minimum filming temperature (TMF) of the emulsion must be such as to produce the film between about 20° and 40° C. with or without the use of coalescent agents.

These will be added in case the composition of the monomers is such as to produce a higher TMF.

In this case amounts of the order of some per cent by weight, of the order from 3 to 7% by weight, as dibutylglycol diacetate (DBGA) can be added without substantially changing the emulsion properties.

Other coalescent agents are for instance propyleneglycolmonomethylether, etc.

Just as an indication the glass transition temperature (Tg) can be used in the on-set point as filming index.

The Tg is generally comprised from 40° to 65° C.

It is preferable that the distribution of the particles diameter is of monomodal type, of sizes generally from 100 to 200 nm, excluding coarse particles or particles aggregates leading to a bimodal distribution. Preferably sizes are from 120 to 170 nm.

The polydispersion of the particles sizes is narrow, generally lower than 0.1.

The weight average molecular weights ($\overline{M}w$) are generally from 100,000 to 500,000. The distribution of the molecular weights $\overline{M}w/\overline{M}$ ($\overline{M}n$ number average molecular weight) is rather wide, generally from 3.5 to 6.

The process for preparing the emulsion of the invention is a conventional process, preferably in semi-batch, which utilizes surfactants and initiators known in the art of emulsions.

As surfactants, sulphonated paraffines, alkylbenzene sulphonates, nonylphenols ethoxylates, etc., can be mentioned.

As initiators ammonium, sodium, or potassium persulphates; tertiary butyl hydroperoxide, cumene hydroperoxide can be mentioned.

The final step of the reaction can be formed by a redox treatment to remove the polymerization residues by using the normal catalytic couples, such as for instance sodium formaldehyde sulphoxylate and terbutylhydroperoxide.

The properties charateristic of the emulsions of the invention are measurable by means of chemical-physical measurements as reported in Example 1, such as: DSC (differential scanning calorimetric analysis) identifying both the decomposition cycle and the decomposition rate at meaningful different temperatures and measuring the amount of organic residue at the end of the thermal cycle utilized for preparing CRT, and after the temperature ranges as defined above.

The thermal cycle carried out in inert ambient, for instance nitrogen, defined below, which simulates that utilized in CRT process is the following:

1° scanning: from 25° C. to 375° C. at 11° C./min.
2° scanning: from 375° C. to 440° C. at 5° C./min.
3° scanning: isotherm at 440° C. for 45 minutes.

EXAMPLES

For illustrative but not limitative purposes, some exemplifying examples of the present invention are reported herein.

Example 1

Preparation of the Emulsion

An emulsion having the following composition in % by weight is prepared:

| | |
|---|---|
| butylmethacrylate (MABU) | 50 |
| Methylmethacrylate (MMA) | 41 |
| Ethylacrylate (AE) | 7 |
| Methacrylic acid (AMA) | 2 |

In a 12 m³ reactor equipped with stirrer, reflux refrigerant connected with a vacuum pump and with a nitrogen feeding, the reactor is made inert with two vacuum operations and nitrogen flow, then a bottom charge is introduced (pt. 2, Tab. 1).

The internal temperature of the reactor is brought to 78° C. by means of a thermostatic bath.

Then a part of the preemulsion (200 kg) indicated in pt. 1, Tab. 1, is started to be added.

After 5 minutes the solution of initiator is added.

When the internal temperature reaches 84° C., the second part of the preemulsion starts to be fed.

The feeding of the preemulsion occurs in about two hours keeping the temperature constant.

Finally the preemulsifier is washed with 100 kg of demineralized water (pt. 4, Tab. 1); it is cooled, the reaction is completed for one hour at the same temperature. Then the reactor is cooled to 50C (pt. 5, Tab. 1) and the redox system is added to complete the removal of the residual monomers. The redox mixture is reported in pt. 6, Tab. 1 and the reaction is carried out for 30 minutes. At the end, at the temperature of about 40° C., 5 parts by weight of DBGA (dibutylglycolacetate) per 100 parts by weight of the total weight of the A+B+C+D monomers forming the emulsion copolymer, are added. Then the temperature is brought to 35° C. adding $NH_3$ in a 28% aqueous solution until a pH 7.5–8 is reached, finally an antimicrobic Kathon LXE of R ohm & Haas dissolved in demineralized water is added.

TABLE 1

| LOAD AMOUNT (kg) | 8000 |
|---|---|
| 1) PREEMULSION | |
| COMPONENT | WEIGHT KG |
| Demineralized $H_2O$ | 1470 |
| EMULGATOR K30 (40%) (sodic alkylsulphonate) | 22 |
| Butylmethacrylate | 1850 (50% by wt.) |
| Methylmethacrylate | 1516 (41% by wt.) |
| Ethylacrylate | 258 (7% by wt.) |
| Methacrylic acid (in 75% solution) | 100 (2% by wt.) |
| TOTAL 1 | 5216 |
| 2) BOTTOM LOAD | |
| COMPONENT | WEIGHT KG |
| Demineralized $H_2O$ | 2340 |
| EMULGATOR K30 (40%) | 25 |
| COMPONENT | WEIGHT kg |
| 3) REACTION INITIATION IN NITROGEN FLOW | |
| The internal temperature of the reactor is brought to 78– 79° C., then the preemulsion is added and 5 minutes later the initiator solution (ammonium persulphate) | |
| Preemulsion | 200 |
| Ammonium persulphate | 21 |
| Demineralized $H_2O$ | 130 |
| At the reaction peak (towards 83–84° C.), feeding of the preemulsion is started. | |
| 4) FEEDING IN NITROGEN FLOW | |
| Duration: 2 hours | |
| Temperature: 82–84° C. | |
| After the two feeding hours the preemulsifier and the line with 100 kg of demineralized water are cleaned | |
| Preemulsion | 5016 (41.8 kg/min) |
| $H_2O$ preemulsifier washing | 100 |
| 5) THERMAL COMPLETION | |
| Duration: 60 minutes | |
| Temperature: 82° C. | |
| The reactor inside is cooled up to 50° C. | |
| 6) REDOX COMPLETION | |
| Duration: 30 minutes | |
| Temperature: 50° C. | |
| FORMOPON (4%) (sodium formaldehyde sulphoxylate) | 75 |
| 7) FINAL ADDITION AT 35° C. | |
| $NH_4OH$ (28%) up to pH 7.5–8 | 34 |
| KATHON LXE | 8 |
| Demineralized $H_2O$ | 8 |

Emulsion Characterization

The emulsion was characterized as follows:
the pH, the particles size and their distribution, the Tg (glass transition temperature) were determined.

The methods utilized are the following:

Determination of the Particles Size

A Counter Nanosizer N4MD was utilized with the following modalities.

In a 4.5 ml cuvette in acrylic material, having an average transparence of 70% at 340 nm, about 4 ml of deionized water and an emulsion portion are introduced to be examined in such a way as to reach a particles concentration changeable from 1 to 2000 μg/ml, depending on the particles size.

Considering the temperature (20° C.), viscosity and refraction index parameters of the suspending agent (1.33 of the deionized water), the cuvette is positioned in the proper place and it is let thermostate for about 10 minutes.

After thermostating one proceeds to determine the particles diameter and standard deviation according to the use manual of the instrument: Manual of the Coulter Electronics 1985–1986, edit. Technical Communication.

Glass Transition (Tg), Nitrogen Thermostability, Distribution of the Molecular Weights The other tests for determining the glass transition, the nitrogen thermostability, the distribution of the molecular weights, are not carried out on the emulsion but on the dried product working as follows.

The emulsion is poured into an aluminium support having a diameter of 5 cm and depth of 0.7 cm, so that the thickness is of about 2–3 mm, it is put in stove at 70° C. for 12 hours to dry the product. A film having an 1.5 mm thickness adhering to the support is obtained. The film is punched to obtain disks having a diameter of about 4 mm.

Determination of the Glass Transition

A DSC (differential scanning calorimeter) of Mettler TA30 type was utilized.

About 20–30 mg of product in the form of a disk, obtained as above, are introduced in the proper aluminium container, whose lid is pierced. The sample is heated at the rate of 20° C. per min. starting from –100° C. up to 100° C. The test is carried out at least twice on different samples until the on-set Tg has a maximum variation within 2° C., preferably 1° C. Also the mid-point and end-set Tg were measured.

Determination of Nitrogen Thermal Stability

A thermobalance Mettler M3 was utilized.

The thermogravimetric analysis is carried out on 20 mg of product in the form of a disk, prepared as above The disk is loaded into an alumina pot, the pot is then introduced in the thermobalance stove. A nitrogen flow (20 liters/hour) is maintained in the stove; before starting heating one awaits 20 minutes so as to allow the complete removal of the oxygen present in the room.

After this period heating is started according to the following thermal profile

1° scanning: from 25° C. to 375° C. at 11° C./min

2° scanning: from 375° C. to 440° C. at 5° C./min

3° scanning: isotherm at 440° C. for 45 minutes.

When the thermal cycle is over, the organic residues are determined by determination of the weight loss.

Relative data as weight loss for the temperature ranges indicated above are given.

Determination of the Distribution of the Molecular Weights

An equipment Waters 510 is utilized and it is operated as follows.

About 80 mg of product under the form of a disk are dissolved in 4 cc of $CHCl_3$.

The so obtained solution is injected into a liquid chromatograph.

Test conditions:

Ultrastyragel columns $10^6$ $10^5$ $10^4$ $10^3$ (polystyrene cured with divinylbenzol).

Refraction index detector, mobile step $CHCl_3$, calibration with polystyrene.

The data of the characterization indicated above are reported in Table 2. The minimum filming temperature (TMF) was determined according to ASTM D2354 standard.

Example 2

The emulsion is prepared according to the procedure of Example 1 but using the following composition in % by weight:

| | |
|---|---|
| Butylmethacrylate (MABU) | 65.3 |
| Methylmethacrylate (MMA) | 25.7 |
| Ethylacrylate (AE) | 7 |
| Methacrylic acid (AMA) | 2. |

Moreover after point 6 of Example 1 no coalescent is added.

Example 3 comparative

The emulsion is prepared according to the procedure of Example 1 but using the following composition in % by weight:

| | |
|---|---|
| Butylmethacrylate (MABU) | 66.5 |
| Methylmethacrylate (MMA) | 37.5 |
| Ethylacrylate (AE) | 0 |
| Methacrylic acid (AMA) | 2. |

After point 6 of Example 1, 5% by weight of dibutylglycol acetate (DBGA) coalescent on the total weight of the copolymer, formed by the components specified above, is added.

Example 4

The emulsion is prepared according to the procedure of Example 1 but using the following composition in % by weight:

| | |
|---|---|
| Butylmethacrylate (MABU) | 47 |
| Methylmethacrylate (MMA) | 42 |
| Ethylacrylate (AE) | 9 |
| Methacrylic acid (AMA) | 2. |

After point 6 of Example 1, 5% by weight of dibutylglycol acetate (DBGA) coalescent on the total weight of the copolymer, formed by the components specified above, is added.

Example 5

The emulsion is prepared according to the procedure of Example 1 but using the following composition in % by weight:

| | |
|---|---|
| Butylmethacrylate (MABU) | 41 |
| Methylmethacrylate (MMA) | 44 |
| Ethylacrylate (AE) | 13 |
| Methacrylic acid (AMA) | 2. |

After point 6 of Example 1, 5% by weight of dibutylglycol acetate (DBGA) coalescent on the total weight of the copolymer, formed by the components specified above, is added.

Example 6 comparative

An aqueous emulsion containing about 46% by weight of a copolymer having an acrylic basis and having a pH between 9 and 10 indicated as Solution A) in U.S. Pat. No. 5,145,511, from line 61, col. 3, is utilized.

The organic residue remaining after the thermal cycle defined above is about 1.5% by weight.

Example 7 comparative

An aqueous emulsion containing about 38% by weight of a copolymer having an acrylic basis and having a pH between 2 and 5 indicated as Solution B) in the US patent of Example 6, from line 67 at col. 3, is utilized.

The minimum filming temperature (Tg) is about 41° C.

The residue remaining after the thermal cycle defined above is of the same order of Example 6.

Example 8 comparative

An aqueous emulsion was prepared by mixing the two emulsions of Examples 6 and 7 in volume ratio 1:1.

The residue remaining after the thermal cycle defined above is of the same order of Example 6.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

TABLE 2

| Examples | 1 | 2 | 3 (compar.) | 4 | 5 | 6 (compar.) | 7 (compar.) | 8 (compar.) |
|---|---|---|---|---|---|---|---|---|
| Tg (°C.) (mid-point) | 51 | 54 | 57 | 50 | 46 | 38 | 49 | 46 |
| Particles average diameter (nm) | 150 | 124 | 139 | 143 | 130 | 126 | 66 | — |
| Weight Loss ΔP/P (%) | | | | | | | | |
| 25–245° C. | 3.3 | 3 | 7.9 | 3.5 | 3.0 | 0.9 | 0.2 | 0.3 |
| 246–375° C. | 45 | 55 | 61 | 46 | 36 | 8 | 1.3 | 8.3 |
| 375–440° C. | 99 | 99 | 99 | 98.5 | 99 | 94 | 97 | 97 |
| isotherm at 440° C. | 99.99 | 99.99 | 99.99 | 99.99 | 99.99 | 98.5 | 98 | 98 |
| Molecular Weight | | | | | | | | |
| M̄w | 300,000 | 113,000 | 157,000 | 179,000 | 156,000 | — | — | — |
| M̄n | 60,000 | 20,000 | 34,000 | 40,000 | 36,000 | — | — | — |
| Mw/Mn | 5 | 5.4 | 4.6 | 4.5 | 4.3 | — | — | — |
| TMF (°C.) | 30 | 36 | — | 32 | — | — | 41 | — |

We claim:

1. Method of coating using aqueous emulsions based on acrylic polymers for preparation of cathode ray tube, comprising coating said cathode ray tube with at least one acrylic polymer to a filming temperature between about 20° and 40° C. which at least one acrylic polymer after drying produces film which, is submitted to heating to remove the polymeric film, the thermogravimetric analysis of which being carried out on 20 mg of product in the form of a disk having a diameter of about 4 mm and a 1.5 mm thickness, in inert ambient, for the following cycle of heating which simulates that utilized in a cathode ray tube process:

11° C./minute from 25° to 375° C.,

5° C./minute from 375° to 440° C., isotherm at 440° C. for 45 minutes, respectively of, having the weight loss $\Delta P/P$ % was the following:

from 25° to 245° C. lower than 15% by weight from 245° to 375° C. from 30 to 70% by weight from 375° to 440° C. from 97 to 99% by weight, and after the isotherm at 440° C. the remaining residue is lower than about 0.3% by weight, a curve gradient in an on-set point ranging from 0.03 to 0.08 mg/°K., and at 360° C. from 0.12 to 0.30 mg/°K.;

the on-set temperature being at most 300° C.

2. Method of coating by using aqueous emulsions according to claim 1, wherein the on-set temperature ranges from 220° to about 285° C.

3. Method of coating using aqueous emulsions according to claim 1, wherein the weight loss $\Delta P/P$ % from 25° to 245° C. is lower than 5% by weight, from 245° to 375° C. is 40–60% by weight, from 375° to 440° C. is 98–99% by weight, after the isotherm at 440° C., the amount of organic residue is less than 0.05% by weight.

4. Method of coating using aqueous emulsions according to claim 1, wherein after the isotherm at 440° C. the amount of organic residue is less than 0.01% by weight.

5. Method of coating using aqueous emulsions according to claim 1, wherein the curve gradient in the on-set point is from 0.06 to 0.08 mg/°K.; at 360° C. is from 0.15 to 0.25 mg/°K.

6. Method of coating using aqueous emulsions according to claim 1, wherein the aqueous emulsions based on acrylic polymers comprise the following composition:

A) butylmethacrylate from 40–75 parts by weight

B) methymethacrylate from 15–50 parts by weight

C) methacrylic acid from 0.5–5 parts by weight

D) ethylacrylate from 4–15 parts by weight.

7. Method of coating using aqueous emulsions according to claim 6, wherein instead of A) lauroyl-, decyl-, undecyl-, ethyl-, propyl-, or ethylhexylmethacrylate is used; instead of C), polymerizable carboxylic acids, selected from the group consisting of acrylic acid, and itaconic acid, are used; instead of D), methylacrylate is used.

8. Method of coating using aqueous emulsions according to claim 6, where a coalescent agent from 3 to 7% by weight of the aqueous emulsion is added.

* * * * *